United States Patent
Kasriel et al.

(10) Patent No.: US 7,269,784 B1
(45) Date of Patent: Sep. 11, 2007

(54) SERVER-ORIGINATED DIFFERENTIAL CACHING

(76) Inventors: Stéphane Kasriel, 1 rue Saint James, 92200 Neuilly (FR); Walter Mann, 165 Prospect Ave., San Francisco, CA (US) 94110

( * ) Notice: Subject to any disclaimer, the term of this patent is extended or adjusted under 35 U.S.C. 154(b) by 481 days.

(21) Appl. No.: 09/827,268

(22) Filed: Apr. 4, 2001

Related U.S. Application Data (60) Provisional application No. 60/263,247, filed on Jan. 22, 2001.

(51) Int. Cl.
*G06N 3/00* (2006.01)
(52) U.S. Cl. ...................................................... 715/500
(58) Field of Classification Search ................ 715/500, 715/513, 517, 523, 530; 709/311, 203
See application file for complete search history.

(56) References Cited

U.S. PATENT DOCUMENTS

| | | | |
|---|---|---|---|
| 5,680,634 A | 10/1997 | Estes | |
| 5,727,129 A | 3/1998 | Barrett et al. | |
| 5,728,129 A | 3/1998 | Summers | |
| 5,774,660 A | 6/1998 | Brendel et al. | |
| 5,802,292 A | 9/1998 | Mogul | |

(Continued)

FOREIGN PATENT DOCUMENTS

DE 010146356 A1 4/2003

(Continued)

OTHER PUBLICATIONS

Jeffrey Mogul et al. "HTTP Delta Clusters and Templates". Network Working Group, Internet Draft, Aug. 24, 2000.

(Continued)

*Primary Examiner*—Stephen Hong
*Assistant Examiner*—Kyle R. Stork
(74) *Attorney, Agent, or Firm*—North Oaks Patent Agency; Shawn B Dempster (57) ABSTRACT

The invention provides a method and system for sending relatively identical web pages, when requested by subsequent users, with substantial reduction of bandwidth. The server determines a "template web page" corresponding to the actual information on the web page, and having a set of insertion points, at which changed data can be inserted by the client. The server sends a JavaScript program corresponding to the template web page, which makes reference to the template web page and the changed data, along with sending the actual changed data itself. A first user requesting the web page receives the entire web page, while a second user requesting the web page (or the first user re-requesting the web page at a later time) receives the template information plus only the changed data. The server re-determines the template web page from time to time, such as when a ratio of changed data to template web page data exceeds a selected threshold. The server identifies the particular template web page to the client using a unique identifier (an "E-tag") for the particular data sent in response to the request. Since the E-tag refers to the template, not the underlying web page, when the standard client makes its conditional request for the web page "if not changed", the server responds that the web page is "not changed" even if it really is, but embeds the changed data in a cookie it sends to the client with the server response to the client request.

22 Claims, 3 Drawing Sheets

U.S. PATENT DOCUMENTS

| | | | |
|---|---|---|---|
| 5,826,258 A | 10/1998 | Gupta et al. | |
| 5,845,088 A | 12/1998 | Lewis | |
| 5,859,971 A | 1/1999 | Bittinger et al. | |
| 5,878,223 A | 3/1999 | Becker et al. | |
| 5,878,429 A | 3/1999 | Morris et al. | |
| 5,931,904 A | 8/1999 | Banga et al. | |
| 5,944,790 A | 8/1999 | Levy | |
| 5,978,841 A | 11/1999 | Berger | |
| 5,983,227 A | 11/1999 | Nazem et al. | |
| 5,987,480 A | 11/1999 | Donohue et al. | |
| 6,003,087 A | 12/1999 | Housel, III et al. | |
| 6,021,426 A | 2/2000 | Douglis et al. | |
| 6,026,413 A | 2/2000 | Challenger et al. | |
| 6,067,565 A | 5/2000 | Horvitz | |
| 6,085,193 A | 7/2000 | Malkin et al. | |
| 6,098,152 A | 8/2000 | Mounes-Toussi | |
| 6,112,242 A | 8/2000 | Jois et al. | |
| 6,138,251 A | 10/2000 | Murphy et al. | |
| 6,144,990 A * | 11/2000 | Brandt et al. | 709/203 |
| 6,154,767 A | 11/2000 | Altschuler et al. | |
| 6,216,212 B1 | 4/2001 | Challenger et al. | |
| 6,256,712 B1 | 7/2001 | Challenger et al. | |
| 6,260,192 B1 | 7/2001 | Rosin et al. | |
| 6,263,352 B1 | 7/2001 | Cohen | |
| 6,314,465 B1 | 11/2001 | Paul | |
| 6,327,628 B1 * | 12/2001 | Anuff et al. | 719/311 |
| 6,343,318 B1 | 1/2002 | Hawkins et al. | |
| 6,374,305 B1 | 4/2002 | Gupta et al. | |
| 6,377,978 B1 | 4/2002 | Nguyen | |
| 6,397,217 B1 | 5/2002 | Melbin | |
| 6,405,252 B1 | 6/2002 | Gupta et al. | |
| 6,453,319 B1 * | 9/2002 | Mattis et al. | 707/100 |
| 6,466,937 B1 | 10/2002 | Fascenda | |
| 6,553,413 B1 | 4/2003 | Leighton et al. | |
| 6,560,604 B1 | 5/2003 | Fascenda | |
| 6,606,525 B1 | 8/2003 | Muthuswamy et al. | |
| 6,623,529 B1 | 9/2003 | Lakritz | |
| 6,629,138 B1 | 9/2003 | Lambert et al. | |
| 6,697,844 B1 | 2/2004 | Chan et al. | |
| 6,704,024 B2 | 3/2004 | Robotham | |
| 6,721,780 B1 | 4/2004 | Kasriel et al. | |
| 6,728,785 B1 | 4/2004 | Jungck | |
| 6,760,746 B1 | 7/2004 | Schneider | |
| 6,826,626 B1 | 11/2004 | McManus | |
| 6,868,453 B1 | 3/2005 | Watanabe | |
| 6,873,877 B1 | 3/2005 | Tobias et al. | |
| 6,912,591 B2 | 6/2005 | Lash | |
| 6,944,817 B1 | 9/2005 | Danneels | |
| 7,058,700 B1 | 6/2006 | Casalaina | |
| 7,072,987 B2 | 7/2006 | Jurisch et al. | |
| 7,092,977 B2 | 8/2006 | Leung et al. | |
| 7,092,997 B1 | 8/2006 | Kasriel et al. | |
| 7,096,418 B1 | 8/2006 | Singhal et al. | |
| 2001/0037361 A1 | 11/2001 | Croy | |
| 2001/0037400 A1 | 11/2001 | Raz et al. | |
| 2001/0056460 A1 | 12/2001 | Sahota et al. | |
| 2002/0048450 A1 | 4/2002 | Zetts | |
| 2002/0056010 A1 | 5/2002 | Lincoln et al. | |
| 2002/0138509 A1 | 9/2002 | Burrows et al. | |
| 2002/0138511 A1 | 9/2002 | Psounis et al. | |
| 2002/0161860 A1 | 10/2002 | Godlin et al. | |
| 2003/0009563 A1 | 1/2003 | Douglis et al. | |
| 2003/0110186 A1 | 6/2003 | Markowski et al. | |
| 2003/0110296 A1 | 6/2003 | Kirsch et al. | |
| 2003/0120752 A1 | 6/2003 | Corcoran | |
| 2004/0128346 A1 | 7/2004 | Melamed et al. | |
| 2006/0168118 A1 | 7/2006 | Godlin et al. | |
| 2006/0168348 A1 | 7/2006 | Casalaina | |

FOREIGN PATENT DOCUMENTS

| | | |
|---|---|---|
| EP | 001662405 A1 | 5/2006 |
| JP | 02003132086 A1 | 5/2003 |
| WO | WO 00/28433 A2 | 5/2000 |
| WO | WO 00/28433 A3 | 5/2000 |
| WO | 02054258 A1 | 7/2002 |

OTHER PUBLICATIONS

Alberto Accomazzi. "rproxy", rproxy/libhsync pages. Jan. 8, 2002.

Delphion Intellectual Property Network to search. "Wecome to the new world of IP Information, Delphion", [online] 1997-2001, Delphion, Inc., [retrieved on Jul. 24, 2001] Retrieved from the internet <URL: http:/www.delphion.com>.

Gould, M., Network Caching Guide: Optimizing Web Content Delivery, Boston, MA, Patricia Seybold Group, Mar. 1999, pp. i-42.

Marshall Brian, How Suff Works, "How Web Servers and the Internet Work," obtained at Internet address http://www.howstuffworks.com/web-server.htm.

"Scalable Web Clusters with Static and Dynamic Contents" Casalicchio, E. Colajanni, M., IEEE International Proceedings on Conference Cluster Computing, pp. 170-177, Nov. 2000.

"Intelligent Prefetch in WWW Using Client Behavior Characterization" Swarninathan, N. Raghavan, S.V., International Symposium on Modeling, Analysis and Simulation of Computer and Telecommunication Systems, pp. 13-19, Sep. 2000.

"A Schema-Based Approach to Web Engineering" Kuhnke, C. Schneeberger, J. Turk, A., System Sciences, SCHEMA Electronic Documentation Solutions pp. 10, Jan. 2000.

A Survey of Web Caching Schemes for the Internet: ACM SIGCOMM Computer Communication Review, pp. 36-46, Oct. 1999.

Client-Server Computing in Mobile Environment, Jin Jing. Abdelsalam Helal and Ahmed Elmagarmid, ACM Computing Surveys, vol. 31 No. 2, Jun. 1999.

"Active Cache: caching dynamic contents on the Web", Pei Cao, Jin Zhang and Kevin Beach, The British Computer Society, The Institution of Electrical Engineers & IOP Publishing Ltd., 1999.

* cited by examiner

SERVER-ORIGINATED DIFFERENTIAL CACHING

BACKGROUND OF THE INVENTION

1. Field of the Invention

This invention relates to differential caching.

2. Related Art

When users (at client devices) request information from a server (at a server device), it often occurs that those users request identical, or nearly identical, information from the server. When the requested information is identical, there are known techniques for providing identical information without incurring the same amount of resource burden on the server. For one example, a single proxy for multiple users can cache the identical information, and simply provide the identical information to each user (after the first) who requests that information. This method is known in the art as "proxy caching". For a second example, the server can maintain its own cache, and similarly provide the identical information to each user (after the first) who requests that information. This method is known in the art as "reverse proxy caching".

While these known methods generally achieve the goal of providing identical information to multiple users, they are unable to provide information that is not identical, even if that non-identical information is very similar. For example, information can be non-identical, even if very similar, for one or more of the following reasons:

The web page requested by users includes a banner ad that is changed at relatively frequent intervals by the server or by a redirected server for the banner ad.

The web page requested by users includes a report of data from a database that is changed at relatively frequent intervals. One example of such a database includes a database of stock market prices or related data.

The web page requested by users includes personalization or other data specific to the user requesting the page. One example of such a web page includes a web page with local news or weather reports specific to the locale of the requesting user.

Known methods of sending such non-identical information include "delta encoding", in which the server determines a set of changes between an earlier web page served to an earlier request, and a new web page served in response to a new request. While these methods of delta encoding can obtain significant compression of a new web page, it suffers from several drawbacks. First, these methods depend on the server being able to determine a version of the web page that the requesting user already has, so as to be able to send only changes from that base web page. Thus, if the requesting user does not have an earlier copy of the web page (or if the earlier copy of the web page is relatively stale), the degree of effective compression is substantially reduced. Second, these methods depend on the server and the user having a protocol by which the server can send only changes to the base web page. Thus, if the requesting user does not implement that protocol, there is no substantial advantage obtained.

Accordingly, it would be desirable to provide a technique for providing relatively identical (but still non-identical) web pages, when requested by subsequent users, with substantial reduction of bandwidth or other resource consumption, that is not subject to drawbacks of the known art.

SUMMARY OF THE INVENTION

The invention provides a method and system for sending relatively identical (but still non-identical) documents, when requested by subsequent users, with substantial reduction of bandwidth or other resource consumption by the server. In a preferred embodiment, the server determines at least one "template document" corresponding to the actual information on the document, and having a set of insertion points, at which changed (or personalized) data can be inserted by the client. In a preferred embodiment, the document includes a web page, but other types of document (such as for example bulletin boards or newsgroups, email or groupware messages, database entries, or other frequently requested information) would be within the scope and spirit of the invention.

The server sends a web page including a code fragment capable of being executed at the client without further knowledge by the client of the techniques used by the invention. In a preferred embodiment, the code fragment includes a JavaScript program, but other executable or interpretable instructions (such as for example email macros or scripts, XML extensions, or other program scripts) would be within the scope and spirit of the invention.

The program code fragment corresponds to a selected template web page; the code fragment makes reference to a template web page including a set of insertion points for changed data, along with sending the actual changed data itself. A first user requesting the web page receives the entire web page, while a later user requesting the web page (or the first user re-requesting the web page at a later time) receives the template information plus only the changed data. This later user might be (a) the very next user, (b) a later user after the web page has been sent several times, or (c) the first user might be sent the original page as a "template", with the hope that later "changed" information will be zero length. Thus, the later client with access to the template web page can receive only the changed data, substantially reducing the amount of bandwidth or other resources used for the transfer.

In a preferred embodiment, the server re-determines the template web page from time to time, such as when a ratio of changed data to template web page data exceeds a selected threshold. Thus, the server can have multiple template web pages corresponding to a set of actual web page data. The server identifies the particular template web page to the client using a unique identifier (herein called an "E-tag") for the particular data sent in response to the request (thus, the entire actual web page would have a different E-tag from the template web page).

When the client requests the web page, it makes a conditional request, indicating the E-tag for those versions of the template web page it has. (This does not require modification of the client, because most clients already make conditional requests for web pages, indicating those web pages they already have in their local cache.) The server examines the E-tag in the conditional request, and in response thereto, determines if the client has at least one non-stale version of at least one template web page, and if so, which one of those template web pages is preferred for minimizing time for sending the changed data for the newest version of the web page. Thus, if the client already has a non-stale template, the server can just send the changed data. Alternatively, the server can send a new template, plus the changed data for insertion, plus a new E-tag for the new template. Since the E-tag refers to the template, not the underlying web page, when the standard client makes its conditional request for the web page "if not changed", the server responds that the web page is "not changed" even if it really is, but embeds the changed data in a cookie it sends to the client with the server response to the client request.

The invention has general applicability to compression and sending of information, not limited specifically to web pages, use of web protocols, or caching. For example, embodiments of the invention can include one or more of, or some combination of, the following applications:

Compression or sending of real-time data, where that data varies substantially only for a small part of the data.

Compression or sending of messages, including email or groupware messages, bulletin board or newsgroup messages.

Compression or sending of database responses, including responses to common or frequently-used database queries.

Moreover, techniques used by a preferred embodiment of the invention for compression or sending of information can be used in contexts other than the specific applications disclosed herein. For example, techniques used by embodiments of the invention for compression and sending of information are all generally applicable to fields other than the specific applications disclosed herein.

DESCRIPTION OF THE PREFERRED EMBODIMENT

The invention is described herein with regard to preferred steps and data structures. Those skilled in the art will recognize, after perusal of this application, that the described steps and data structures are not limited to any particular processing devices (whether general-purpose or special-purpose processing devices, or specific circuitry). Rather, those of ordinary skill in the art would be able to implement the described steps and data structures, and equivalents thereof, without undue experimentation or further invention. All such implementations are within the scope and spirit of the invention.

Lexicography

The following terms refer or relate to aspects of the invention as described below. The descriptions of general meanings of these terms are not intended to be limiting, only illustrative.

client and server—As used herein, the phrases, "client" and "server" refer to a relationship between two devices, particularly to their relationship as client and server, not necessarily to any particular physical devices.

client device and server device—As used herein, the phrase "client device" includes any device taking on the role of a client in a client-server relationship (such as an HTTP web client and web server). There is no particular requirement that any client devices must be individual physical devices; they can each be a single device, a set of cooperating devices, a portion of a device, or some combination thereof. As used herein, the phrase "server device" includes any device taking on the role of a server in a client-server relationship. There is no particular requirement that server devices must be individual physical devices; they can each be a single device, a set of cooperating devices, a portion of a device, or some combination thereof.

Document—As used herein, the term "document" includes any collection of information sent to the recipient operator or user, and thus includes at least any of the following (a) multiple versions of the same web page, file, or other network object; or (b) data that is generated dynamically for presentation as a web page, file, or other network object, such as by a script that generates different versions of a document dynamically from a number of sources, such as by querying a database, generating a session ID, and the like.

logically remote—As used herein, the phrase "logically remote" refers to the relative logical placement or degree of connectivity between two or more computerized systems or two or more elements within a single system. Generally, elements that are relatively proximate to each other may be logically remote if there is a small probability that information will flow between them on a regular basis.

operator—As used herein, the term "operator" refers to any actor capable of performing the functions of an operator ad described herein. An "operator" might comprise an individual person, a set of persons having authority to act in particular way, a proxy for an individual person or set of persons, such as a human secretary or a computer program having the function of forwarding or aggregating or scheduling requests made by others, or even an AI (artificial intelligence) program such as an expert system or otherwise. There is no particular requirement that the operator must have a particular level of authority or intelligence, so long as the operator has the capability of issuing instructions attributed to the operator as described herein.

workstation—As used herein, the term "workstation" refers to any device capable of performing the functions of a workstation as described herein. A workstation might comprise an individual computing device, a set of multiple computing devices operating in concert or cooperation, a portion of a computing device used for a particular function (such as a software package used on an otherwise general-purpose device), or some combination or mixture thereof. There is no particular requirement that a "workstation" include any particular computing device: a "workstation" might include a personal computer, a software package on a server, a handheld computer cooperating with a personal computer or with a server (or both), or a telephone interface to a system such as an interactive voice response system. There is also no particular requirement that multiple workstations used by a single collaborator need be of the same type. For example, a single collaborator might have a single server for access to the hub, a set of personal computers each having separate access to the hub (or alternatively, separate access to a subset of functions of the hub), and a set of handheld computers used by personnel in the field for access to the hub.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
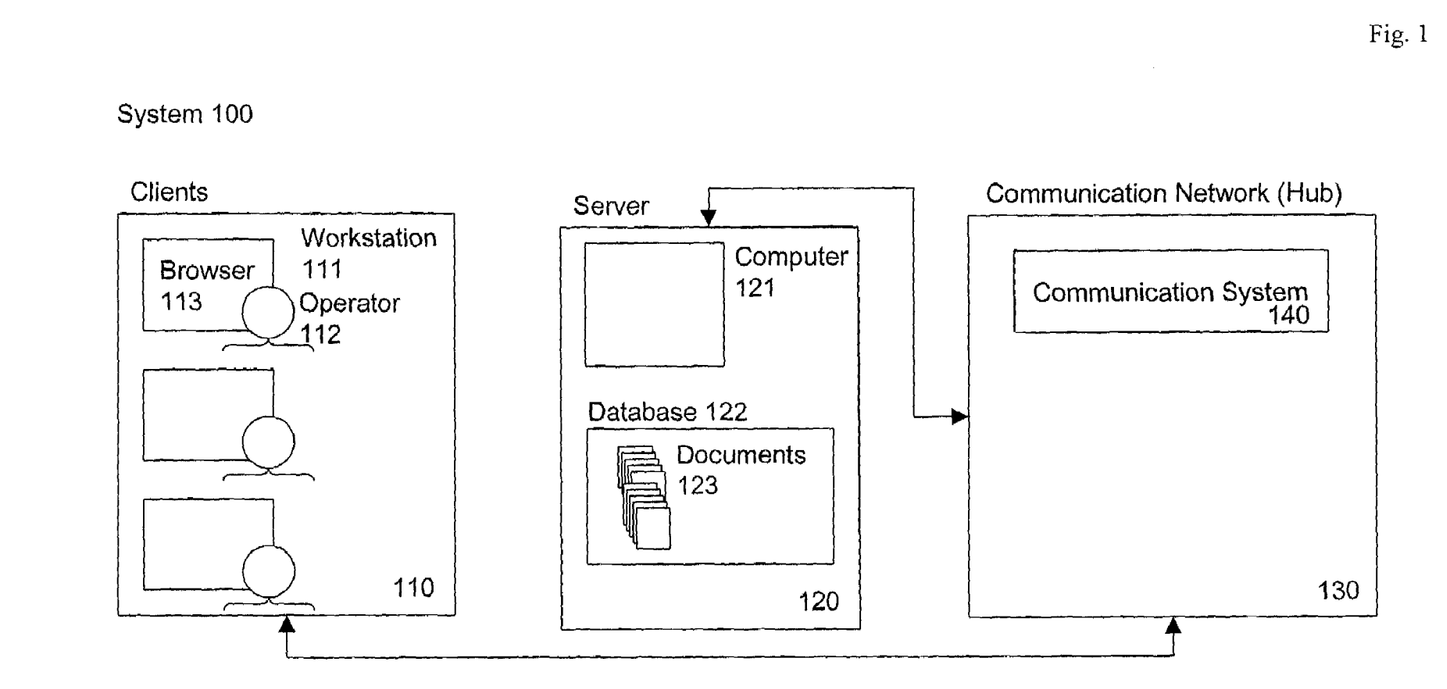
FIG. 1 shows a block diagram of a system for performing methods shown herein.

FIG. 1 shows a block diagram of a system for performing methods shown herein.

A system 100 includes one or more clients 110, a server 120, and a communication network 130.

Client Devices

Each client 110 includes a client workstation 111 and a client operator 112.

Also as noted above, there is no particular requirement that a "workstation" include any particular computing device: a "workstation" might include a personal computer, a software package on a server, a handheld computer cooperating with a personal computer or with a server (or both), or a telephone interface to a system such as an interactive voice response system. There is also no particular requirement that multiple workstations used by a single client need be of the same type. For example, a single client might have a single server for access to the hub, a set of personal computers each having separate access to the hub (or alternatively, separate access to a subset of functions of the hub), and a set of handheld computers used by personnel in the field for access to the hub.

As noted above, in general when an element is described as an "operator" it might comprise an individual person, a set of persons having authority to act in particular way, a proxy for an individual person or set of persons, such as a human secretary or a computer program having the function of forwarding or aggregating or scheduling requests made by others, or even an AI (artificial intelligence) program such as an expert system or otherwise. There is no particular requirements that the operator must have a particular level of authority or intelligence, so long as the operator has the capability of issuing instructions attributed to the operator as described herein.

Each client 110 includes a web browser 113, such as the "Internet Explorer" product or the "Netscape Navigator" product. The web browser 113 is capable of using a message transfer protocol, such as HTTP (hypertext transfer protocol), or a variant thereof, to request documents (such as for example web pages) from the server 120 and to receive documents and other responses from the server 120. In a preferred embodiment, the web browser 113 uses HTTP version 1.1, or at least some features thereof, as described herein.

Server Device

The server 120 includes a computer 121 and a database 122 of documents 123. In a preferred embodiment, documents 123 can include (as further described herein) web pages, embedded objects for web pages, template web pages, changed data for insertion into template web pages, and code fragments.

The server 120 includes a processor, program and data memory, and operates under control of software to perform the tasks described herein. In particular, the server 120 is capable of using a message transfer protocol, such as HTTP or a variant thereof, to receive requests for documents (such as for example web pages) from clients 110 and to respond to those requests by sending those documents to clients 110. In a preferred embodiment, the server 120 uses HTTP version 1.1, or at least some features thereof, as described herein.

Communication Network

The individual clients 110 and the server 120 are coupled using a communication network 130. The communication system 140 is capable of transferring messages from a sender to a set of receivers, such as from a collaborator 110 to the hub 130, from a supplier 120 the hub 130, or from the hub 130 to either a set of collaborators 110 or from the hub 130 to a set of suppliers 120.

In a preferred embodiment, the communication system 140 includes a computer communication network, such as the Internet. However, in alternative embodiments, the communication system 140 might include an intranet, extranet, VPN (virtual private network), ATM system, a portion of a private or public PSTN (public switched telephone network), a frame relay system, or any other communication technique capable of performing the functions described herein.

Reverse Proxy Cache

In a preferred embodiment, the server 120 is coupled to a reverse proxy cache 130, as described below. The reverse proxy cache 130 includes a processor, program and data memory, and mass storage, and is capable of performing the tasks described herein. In particular, the reverse proxy cache 130 records documents in its mass storage in response to action by the server 120 in sending those documents to clients 110. When the reverse proxy cache 130 receives requests for documents from a particular client 110, it can respond to those requests by sending the document to that client 110, or can forward the request to the server 120. When the reverse proxy cache 130 notes a document sent by the server 120 to a client 110, it can record that document in its mass storage, so as to later recognize requests for that document from clients 110 (either the same client 110 asking for the same document a second time, or a second client 110 asking for that document).

As described herein, although in a preferred embodiment the server 120 uses a reverse proxy cache 130, and although in alternative embodiments the system 100 uses a proxy cache 140 or an ASP caching server 150, there is no particular requirement for use of a cache. Rather, the server 120 can send the documents described herein directly to clients 110, without loss of any functionality.

As described herein, the invention has additional value when used in combination with one or more caches (whether a reverse proxy cache 130, a proxy cache 140, an ASP caching server 150, or another type of caching device). As described below, one or more caches in a communication path between a particular client 110 and the server 120 might have a template web page providing a good match with information that client 110 already has, and thus would be able to send to the client 110 only changed data for that template web page. If any of the caches in the communication path have a template web page providing a good match, a preferred embodiment is able to provide the advantages of compression, transparently without the client 110, the server 120, or any other intermediate cache having to act differently or even know about the form of compression described herein, so long as the parts of the compressed document (the code fragment and the cookie with changed data, as described below) can be forwarded from the originating cache to the client 110 without any changed action on the part of any intermediate cache.

Alternative Proxy Caches

In a first set of alternative embodiments, the client 110 may use a (client side) proxy cache 140, which performs the task of caching at the "client side" of communication between the client 110 and the server 120.

The proxy cache 140 may be located either (a) in the same device as the client 110, such as a software proxy cache; (b) in a device logically near to the client 110, such as coupled to a LAN (local area network) with the client 110; or (c) in a device more logically remote from the client 110, such as coupled to a number of clients 110 and serving to provide proxy caching services to those clients 110. Examples of a proxy cache 140 of type C include those proxy caches 140 used by ISPs (internet service providers) and the like.

In these first alternative embodiments, the proxy cache 140 performs the tasks otherwise attributed to the reverse proxy cache 130.

In a second set of alternative embodiments, the system 100 may include an ASP caching server 150, which performs the tasks otherwise attributed to the reverse proxy cache 130 or to the proxy cache 140.

In a third set of alternative embodiments, the system 100 may include more than one such proxy cache, including such combinations of reverse proxy caches 130, proxy caches 140 (of various types), and ASP caching servers 150. There is no particular requirement in any embodiment that the server 120 or any type of cache is required to perform its tasks in a particular location.

Data Flow Diagram

Figure 2:
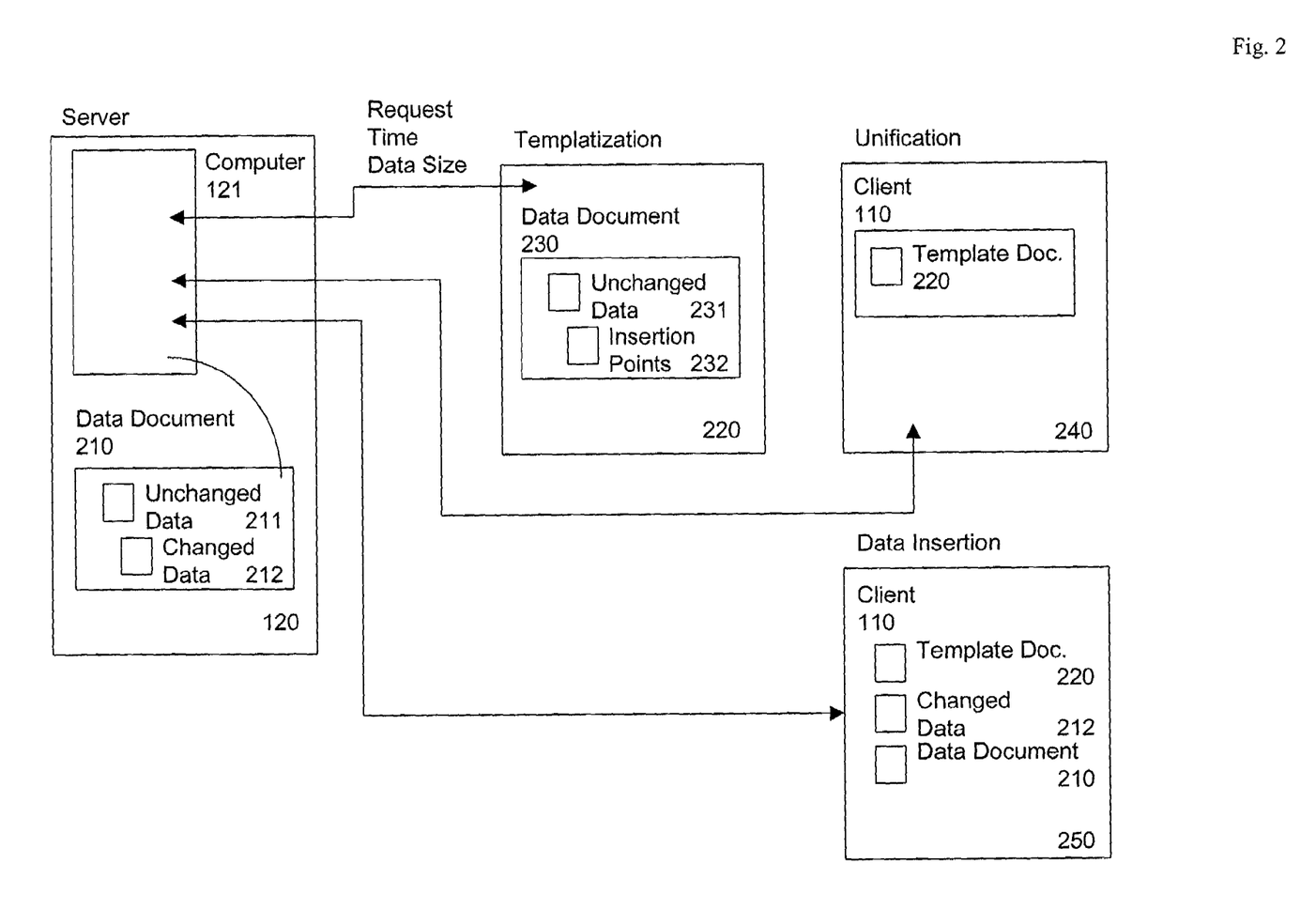
FIG. 2 shows a data flow diagram for methods shown herein.

FIG. 2 shows a data flow diagram of methods shown herein.

A data flow diagram 200 includes representations of a set of documents and related data, and processes for operation on those data.

The server 120 includes an original data document 210 (such as a web page), including a set of unchanged content 211 and a set of changed data 212.

In a data flow process 220 identified as "templatization", the server 120 examines the original data document 210 from time to time and constructs a template document 230 (such as a template web page), including a set of unchanged content 231 and a set of insertion points 232. Each insertion point 232 represents a pointer to changed data 212, recorded in a cookie 233 or other data structure. In a preferred embodiment, the server 120 constructs the template document 230 in response to the original data document 210 at least at the following times:

when the original data document 210 is first made available for requests at the server 120;

after a selected period of time (such as for example, every hour);

or when the size of the changed data 212 is larger than a selected fraction of the size of the original data document 210 (such as for example, when the changed data 212 exceeds 10% of the original data document 210.

In a data flow process 240 identified as "unification", it might occur that there are different versions of the template document 220 at the client 110 and at the server 120. The server 120 compares the template document 220 at the client 110 (identified by its E-tag, as described herein) with the template document 220 at the server 120, so as to determine that the template documents 220 are the same, or at the least sufficiently similar so that changed data 212 can be inserted into the template document 220 at the client 110 using the cookie 233.

In a data flow process 250 identified as "data insertion", the client 110 inserts the changed data 212 from the cookie 233 into the template document 220, to provide a copy of the original data document 210 in the form it was in at the server 120.

Method of Operation

Figure 3:
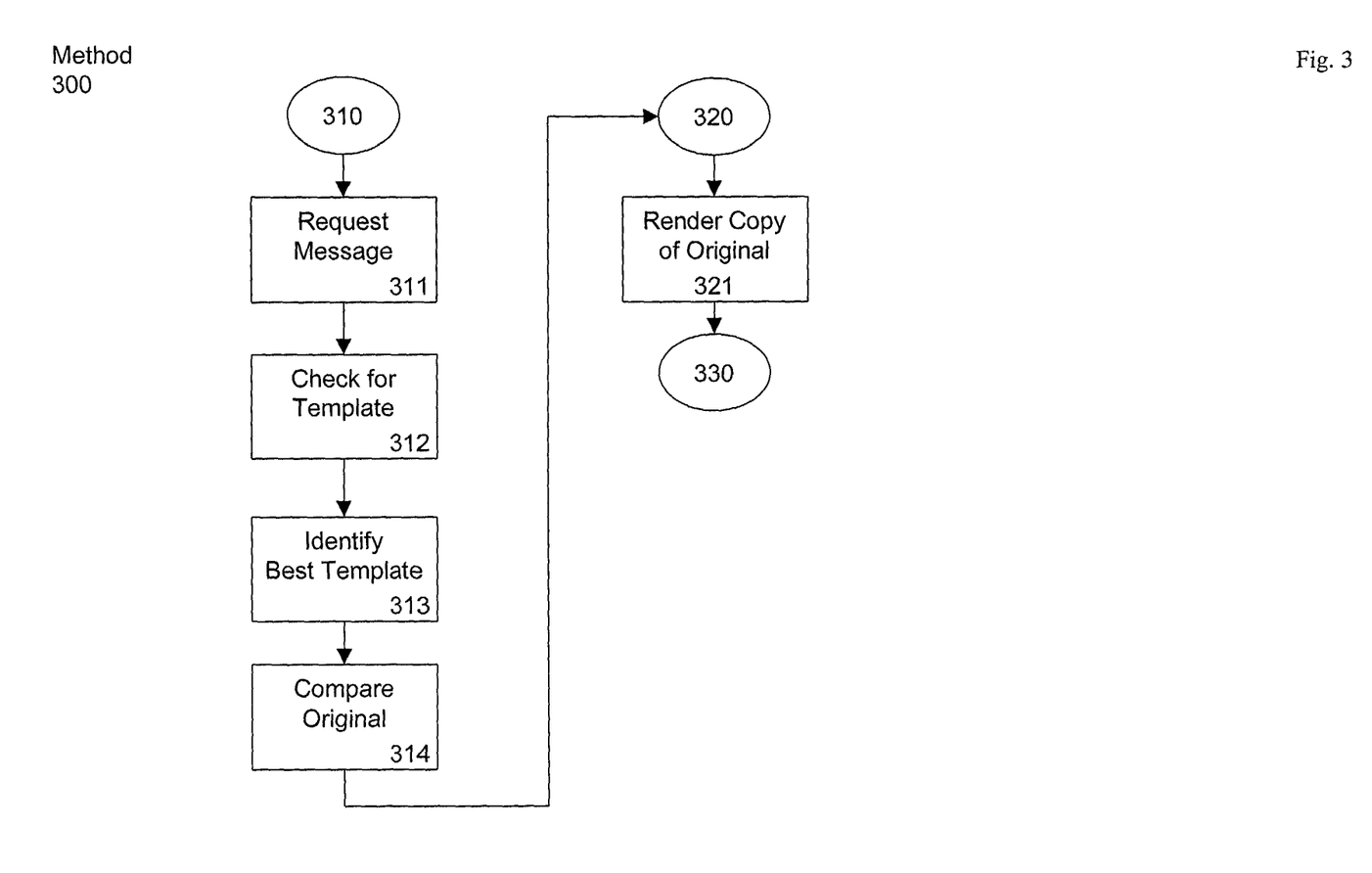
FIG. 3 shows a process flow diagram of a method for compression and sending information.

FIG. 3 shows a process flow diagram of a method for compression and sending information.

A method 300 includes a set of flow points and process steps as described herein.

Although by the nature of textual description, the flow points and process steps are described sequentially, there is no particular requirement that the flow points or process steps must be sequential. Rather, in various embodiments of the invention, the described flow points and process steps can be performed in a parallel or pipelined manner, either by one device performing multitasking or multithreading, or by a plurality of devices operating in a cooperative manner. Parallel and pipelined operations are known in the art of computer science.

At a flow point 310, a client 110 is ready to make a request for a document (such as the original data document 210) from the server 120. In a preferred embodiment, each individual document request is performed independently, even if a plurality of document requests are to be performed substantially simultaneously.

At a step 311, the client 110 generates a request message 161 (shown in FIG. 1) for the document. The request message 161 identifies the document and requests that the server 120 send the document to the client 110.

In a preferred embodiment, the request message 161 includes an HTTP "last-modified/if-modified-since" protocol message or an HTTP "E-tag/if-none-match" protocol message. For example, if the client 110 has template versions #1, #2 and #3 for the web page "Fireclick.html" at its local cache, and the client operator 112 requests that web page, the client 110 generates the following HTTP request:

GET /A.html HTTP/1.1

Host: www.site.com

If-None-Match: 1,2,3

At a step 312, the server 120 determines if it has a template document 230 for the requested original data document 210.

If the server 120 does not have a template document 230, the server 120 simply generates a response message 162 to the client 110, and the method 300 continues with the flow point 320 (successful delivery of the original data document 210 to the client). As part of this step, in a preferred embodiment, the server 120 will then attempt to templatize the original data document 210, to provide a template document 230 for the requested original data document 210 (for future requests).

If the server 120 does have a template document 230, the method 300 proceeds with the next step.

At a step 313, the server 120 identifies its best (such as for example most recent) template document 230 for the requested document. If the best template document 230 is one of the template documents 230 at the client 110, the method 300 performs this step, and continues with the flow point 320. If the best template document 230 is not one of the template documents 230 at the client 110, the method 300 performs the next step 314, and continues with the flow point 320.

At part of this step, the server 120 generates a response message 162 sending the identified template document 230 to the client 110, along with a cookie 233 including changed data to be inserted at insertion points 232 in the template document 230. As described herein, at the insertion points 232, the template document includes code fragments (such as for example JavaScript) capable of reading the changed data 212 in the cookie 233 and inserting that changed data 212 into the template document 230 at the client 110.

In a preferred embodiment, the response message 162 includes an HTTP "304 content not-modified" protocol message, with an included HTTP "set-cookie" option. The associated cookie includes only the changed data 212. As described below, the client 110 will receive the response message 162, re-parse the HTML page, re-execute the JavaScript, which reads in the new cookie, and therefore renders the new original data document 210 from the same template document 230.

Using the example above, presume the client 110 had template versions #1, #2 and #3 for the web page "Fireclick.html" at its local cache, and the client operator 112 requested that web page. When the server 120 receives that request, the server 120 generates (or retrieves) the original data document 210 for "Fireclick.html". The server 120 compares the original data document 210 with the versions of the template document 230 present at the client 110 and picks one, such as for example #2. The server 120 determines the changed data 212 and encodes them into the cookie 233. If for example, the changed data is the text string 'patentapplication', the server 120 will make the following HTTP response:

304 HTTP/1.1 Not-Modified
ETag: 2
Set-Cookie: delta=patentapplication

At a step 314 (the best template document 230 was not one of the template documents 230 at the client 110), the server 120 compares the original data document 210 with the new template document 230, and generates a response message 162 including the new template document 230 and the changed data 212 in the cookie 233. Using the example above, if the new template document 230 at the server 120 is #4, and the changed data is the text string 'patent', the server 120 will make the following HTTP response:

200 HTTP/1.1 OK
ETag: 4
Set-Cookie: delta=abcd
<HTML contents of the template, including JavaScript>

At a flow point 320, the client 110 has received the response message 162, and has one of the following:
the original data document 210;
an E-tag for a template document 230 already at the client 110, plus changed data 212 in a cookie 233;
or
a new template document 230, plus changed data 212 in a cookie 233.

At a step 321, the client 110 parses the received document, performs any code fragments (JavaScript at insertion points 232), and inserts any changed data 212, so as to render a copy of the original data document 210 at the server 120.

At a flow point 330, the method 300 has completed delivery of a copy of the original data document 210 from the server 120 to the client, and is ready to process a new request.

Generality of the Invention

The invention has general applicability to compression and sending of information, not limited specifically to web pages, use of web protocols, or caching. For example, embodiments of the invention can include one or more of, or some combination of, the following applications:

Compression or sending of real-time data, where that data varies substantially only for a small part of the data.

Compression or sending of messages, including email or groupware messages, bulletin board or newsgroup messages.

Compression or sending of database responses, including responses to common or frequently-used database queries.

Moreover, techniques used by a preferred embodiment of the invention for compression or sending of information can be used in contexts other than the specific applications disclosed herein. For example, techniques used by embodiments of the invention for compression and sending of information are all generally applicable to fields other than the specific applications disclosed herein.

Other and further applications of the invention in its most general form would be clear to those skilled in the art after perusal of this application. The invention would be usable for such other and further applications without undue experimentation or further invention.

Although preferred embodiments are disclosed herein, many variations are possible which remain within the concept, scope and spirit of the invention; these variations would be clear to those skilled in the art after perusal of this application.

The invention claimed is:

1. A method for transmitting a web page, comprising steps of:
generating a plurality of template document versions from an original data document at a server, each template document including a set of insertion points, each insertion point including code fragments usable by a client and capable of reading changed data and inserting the read changed data into the template document to render a copy of the original data document at the client;
receiving a request message at the server relating to the original data document, the request message comprising indicia of template document versions in a client local cache; and
sending a response message in response to the request message by selecting one of the plurality of template document versions based on the indicia in the response message and including information identifying the selected template document version in the response message such that the client may utilize the selected template document version in the client local cache along with the changed data to render the copy of the original data document at the client.

2. The method of claim 1 wherein the receiving step comprises receiving the request message formed as an HTTP protocol message and wherein the sending step comprises sending the response message as an HTTP protocol message.

3. The method of claim 1 wherein the receiving step comprises receiving the request message including information identifying at least one template document already available to a sender of the request message in a client local cache.

4. The method of claim 1 wherein the sending step comprises sending the response message including the template document.

5. The method of claim 1 wherein the sending step comprises sending the changed data includes a set of changed data from an earlier version of the original data document.

6. The method of claim 1 wherein the sending step comprises sending the changed data includes a set of personalized data relating to a version of the original data document.

7. The method of claim 1 comprising a step of redefining the template document in response to changes in the original document.

8. The method of claim 7 wherein the redefining step comprises redefining the template document in response to the changed data being larger than a selected fraction of a size of the original data document.

9. The method of claim 1 wherein the code fragments include JavaScript.

10. A method of presenting a web page at the client comprising the steps of claim 1 and further comprising a step of rendering the copy of the original data document at the client by: (i) parsing the template document, (ii) performing any code fragments, and (iii) inserting any changed data at the set of insertion points in the template document.

11. The method of claim 1 wherein the changed data comprises a cookie.

12. A server apparatus comprising:
a templatization mechanism that generates a plurality of template document versions from an original data document, each template document including a set of insertion points, each insertion point including code fragments usable by a client and capable of reading changed data and inserting the read changed data into the template document to render a copy of the original data document at the client;
a receiver configured to receive a request message from the client relating to the original data document, the request message comprising indicia of template document versions in a client local cache; and
a transmitter configured to send a response message in response to the request message by selecting one of the plurality of template document versions based on the indicia in the response message and including information identifying the selected template document version in the response message such that the client may utilize the selected template document version in the client local cache along with the changed data to render the copy of the original data document at the client.

13. The server apparatus of claim 12 wherein the request message comprises an HTTP protocol message and the response message comprises an HTTP protocol message.

14. The server apparatus of claim 12 wherein the request message includes information identifying at least one template document already available to a sender of the request message in a client local cache.

15. The server apparatus of claim 12 wherein the response message includes the template document.

16. The server apparatus of claim 12 wherein the changed data includes a set of changed data from an earlier version of the original data document.

17. The server apparatus of claim 12 wherein the changed data includes a set of personalized data relating to a version of the original data document.

18. The server apparatus of claim 12 wherein the templatization mechanism is configured to redefine the template document in response to changes in the original document.

19. The server apparatus of claim 18 wherein the templatization mechanism is configured to redefine the template document in response to the changed data being larger than a selected fraction of a size of the original data document.

20. The server apparatus of claim 12 wherein the code fragments include JavaScript.

21. A system comprising the server apparatus of claim 12 and further comprising the client, the client being configured to render the copy of the original data document by: (i) parsing the template document, (ii) performing any code fragments, and (iii) inserting any changed data at the set of insertion points in the template document.

22. The server apparatus of claim 12 wherein the changed data comprises a cookie.

* * * * *